BENONI YAW.
Improvement in Butter-Printers.
No. 132,999.　　　　　　　　　　　　Patented Nov. 12, 1872.
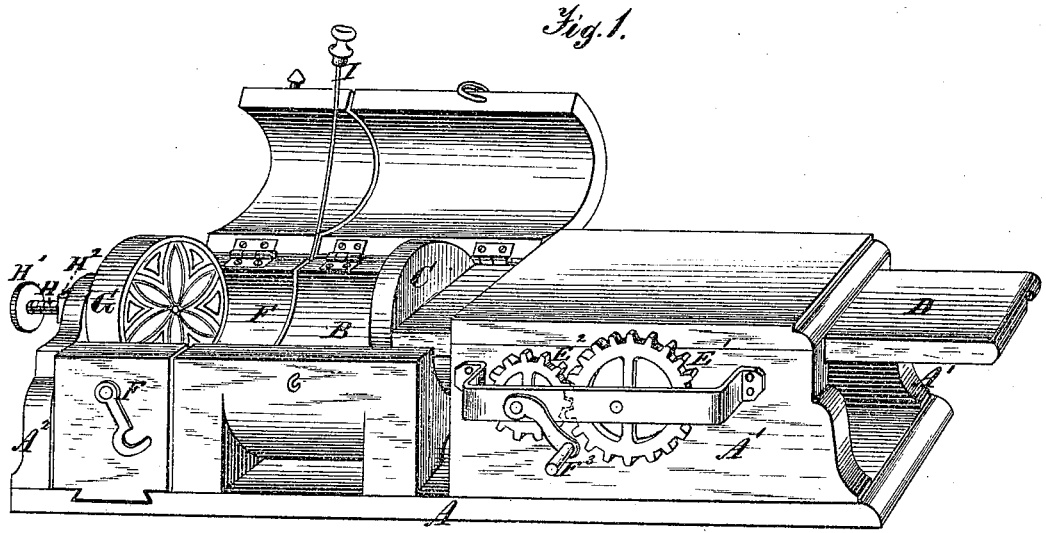
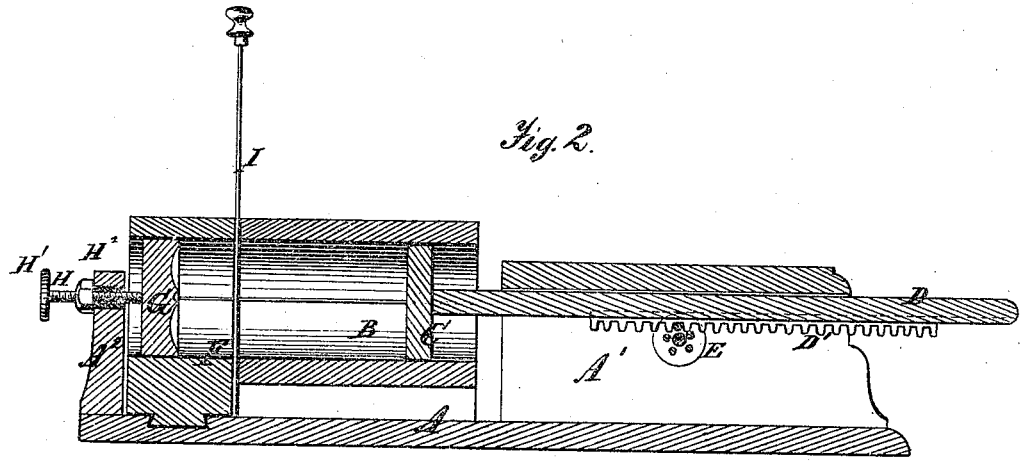
Witnesses　　　　　　　　　　　　Inventor:

UNITED STATES PATENT OFFICE.

BENONI YAW, OF NEW CONCORD, OHIO.

IMPROVEMENT IN BUTTER-PRINTERS.

Specification forming part of Letters Patent No. 132,999, dated November 12, 1872.

*To all whom it may concern:*

Be it known that I, BENONI YAW, residing at New Concord, in the county of Muskingum and State of Ohio, have invented certain Improvements in Machines for Making Prints of Butter, of which the following is a specification:

The nature of this invention consists in providing a machine which is capable of working up a roll or mass of butter into prints of required weight by simply feeding it successively forward into a suitable mold, thus avoiding the danger of destroying the grain of the butter by too much manipulation, in consequence of which the prints present a greasy appearance.

The machine is composed, principally, of a suitable receptable for the roll or mass of butter, a follower to feed it forward, and a movable mold, into which the butter is forced to form prints; and embodies other minor features of novelty, which will be generally explained in the ensuing description and specifically pointed out in the claims.

Figure 1 represents the machine in perspective, showing the cylinder and mold opened. Fig. 2 is a vertical longitudinal section thereof.

The same letters of reference are employed in both figures in the designation of identical parts.

The various parts of the machine are mounted upon the bed A. The roll or mass of butter to be transformed into prints is placed in a cylindrical or otherwise formed receptacle, B, before the follower C, which is snugly fitted in the receptacle. For the sake of convenience in filling the receptacle, as well as in cleansing it, it is made in two or more sections, hinged together in the manner illustrated. The follower is fastened to the end of a slide, D, which moves in guides or grooves in the cheeks $A^1$ on the bed A. This slide is provided with a rack, $D'$, upon one side, which is in gear with the pinion E, which is rotated to move the slide and follower by means of a crank, $E^3$, and intermediate wheels $E^2$ and $E^1$. Many other well-known contrivances may be employed for operating the follower in place of the mechanism here shown and described. The butter is forced by the follower out of the open end of the cylinder B into a mold, F, in line therewith and nearly abutting against it. The other end of the mold is closed by an adjustable print, G, which, in the example shown, bears with its back against a screw-bolt, H, carried in a nut in the standard $A^2$, and provided with a hand-wheel, $H^1$, for facilitating its adjustment in and out. The bolt is also furnished with a lock-nut, $H^2$, to station it in any required position. By means of this bolt and the movable print the capacity of the mold may be regulated according to the size or weight of the prints of butter wanted.

The mold, made in sections and hinged together like the receptacle B, can be slid laterally out of its seat on the bed A for the purpose of removing the prints of butter as they are formed, and cut off by means of a wire, I, or other suitable device.

What I claim as my invention, and desire to secure by Letters Patent, is—

1. The combination of the receptacle B, follower C, movable mold F, and cut-off I, substantially as and for the purpose specified.

2. The receptacle B, follower C, and movable mold F, operated substantially as described, in combination with the adjustable print G and bolt H with its lock-nut $H^2$, for the purpose of regulating the capacity of the mold and the size of the prints of butter, substantially as described.

BENONI YAW.

Witnesses:
JAMES FOLEY,
HENRY TIMMS.